United States Patent [19]

Ermakova et al.

[11] Patent Number: 5,720,778
[45] Date of Patent: Feb. 24, 1998

[54] METHOD OF PRODUCING HIGH-MOLECULAR PRODUCTS FROM COLLAGEN-CONTAINING MATERIALS, AND PRODUCT PRODUCED BY THE SAME

[75] Inventors: Irina M. Ermakova, Moscow, Russian Federation; Boris S. Khaytin, Brooklyn, N.Y.; Arcady L. Beleske, Marblehead, Mass.

[73] Assignee: Boston Bay International, Inc., Marblehead, Mass.

[21] Appl. No.: 708,297

[22] Filed: Sep. 4, 1996

[51] Int. Cl.$^6$ ..................................... C08H 1/06
[52] U.S. Cl. ..................... 8/94.18; 8/94.15; 8/94.11; 8/94.2; 8/94.21; 524/10; 524/11
[58] Field of Search .................. 8/94.1 R, 94.11, 8/94.15, 94.18, 94.21, 94.2; 252/8.57; 524/10, 11

[56] References Cited

U.S. PATENT DOCUMENTS

| | | | |
|---|---|---|---|
| 4,412,947 | 11/1983 | Cioca | 530/356 |
| 4,533,358 | 8/1985 | Yoden et al. | 8/94.11 |
| 4,834,762 | 5/1989 | Nishibori | 8/94.1 R |
| 5,322,648 | 6/1994 | Dapper | 264/1.1 |

FOREIGN PATENT DOCUMENTS

| | | |
|---|---|---|
| 2734503 | 2/1979 | Germany. |
| WO94/12563 | 6/1994 | WIPO. |

*Primary Examiner*—Alan Diamond
*Attorney, Agent, or Firm*—Ilya Zborovsky

[57] ABSTRACT

A method of producing a collagen-containing material has the steps of comminuting untanned collagen-containing raw material, preparing from the raw material a collagen solution, preparing a leather paste from tanned collagen-containing waste, mixing the collagen solution and the leather paste to produce a mixture, adding a cross-linking agent to the mixture, freezing and unfreezing the mixture, and performing a preliminary treatment of the untanned collagen-containing raw material with a solution of alkali and a surfactant with pH less than 9.5.

11 Claims, No Drawings

METHOD OF PRODUCING HIGH-MOLECULAR PRODUCTS FROM COLLAGEN-CONTAINING MATERIALS, AND PRODUCT PRODUCED BY THE SAME

BACKGROUND OF THE INVENTION

The present invention relates to a method of producing high-molecular products from collagen-containing materials.

The method can be utilized for producing leather-like material for making shoes and other articles, in printing industry, in construction industry for decoration of walls and manufacture of heat-insulating and sound-insulating panels in automobiles, airplanes and railroad cars for insulation and decoration of compartments, for manufacture of furniture, in chemical and electronic industry for making filtering elements for purification of aggressive liquids such as gasoline, and for gas and air cleaning.

It is known to produce leather-like material from wastes of leather manufacture, as disclosed in Russian Patent 2,018,540. In the method disclosed in this patent a collagen solution is prepared, then a paste of tanned wastes of leather manufacture with particles of not greater than 0.66 mm is prepared, then a paste of tanned wastes of leather manufacture with particles of not greater than 0.66 mm is prepared, the solution and the paste are mixed for 1 to 5 hours at the temperature not exceeding 15° C., then the mass is filtered, cooled, a cross-linking agent is added, the mass is homogenized at the temperature not exceeding 5° C., cooled and retained in the cooled state, defrosted, and a salt washing with subsequent pressing are performed. The above described method is labor-consuming and time consuming. The quantity of the products obtained produced in accordance with this method depend substantially on the quality of the utilized tanned and untanned wastes of the leather manufacture. Also, the solution utilized in the above mentioned method has a high pH, and therefore the mass has the tendency to swell the partial dissolving of the material.

SUMMARY OF THE INVENTION

It is therefore an object of the present invention to provide a method of producing high-molecular products from a collagen-containing material, which avoids the disadvantages of the prior art.

In keeping with these objects and with others which will become apparent hereinafter, one feature of the present invention resides, briefly stated in a method of producing high-molecular products from a collagen-containing material in accordance with which during preparation of a collagen solution from untanned collagen-containing raw material, the untanned collagen containing raw material is subjected to a preliminary treatment with a solution containing an alkali, and surfactant with pH not exceeding 9.5.

In particular, the untanned collagen-containing raw material can be subjected to treatment with a solution containing 5 to 7 g/m sodium hydrate, 10 to 15 g/l sodium carbonate and 2 to 5 g/l surfactant with liquid-solid ratio 1, 8 to 2.

When the method is performed in accordance with the present invention, the obtained mass does not swell and there is no dissolving of the collagen material. As a result, more product and also products with higher properties are produced.

It is also an object of the present invention to provide a product produce by the inventive method.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

In accordance with the present invention an initial untanned collagen-containing raw material is subjected to a preliminary treatment with a solution containing 5 to 7 g/m sodium hydrate, 10 to 15 g/l carbonate and 2 to 5 g/l surfactant with liquid-solid ratio 1.8 to 2.

The treatment is performed during 2.5 to 3.0 hours with a subsequent water washing to pH=5.0 to 5.5% solution by hydrochloric acid at pH=4.5 to 5.0 during 2.0 to 2.5 hours, and then the product is subjected to a cycle freezing at the temperature=6° to −10° C. during 2 hours with the number of cycles 2 to 5. After unfreezing, the product is subjected to alkali-salt treatment. Such a preliminary treatment of the raw material allows the utilization of wastes having different contents of fat tissues. In order to reduce the time of the alkali-salt treatment of the product and increase the removal of ballast protein ad mixtures, the alkali-salt treatment is performed in two stages. The first stage is performed with the presence of salt of sulphuric acid. The treatment is performed with the solutions containing 2.5 to 4.0 g/l sodium hydrate and 8 to 10 g/l sodium sulphate with liquid-solid ratio 2 to 2.5 during 6 to 8 hours at room temperature. After the intermediate washing with water at liquid-solid ratio 8 to 10, the second stage is performed with the presence of salts of phosphoric acid, and in particular with the solution which contains sodium phosphate or ammonium phosphate 0.1 to 0.3% of weight of raw material at pH=8 to 8.3 finalized by the sodium hydrate during 2 to 2.5 hours. This allows the execution of directional hydrolysis of the raw material for breaking of traverse inter-fibrillar ties and more complete removal of ballast protein admixtures.

The product after the alkali-salt treatment is treated with a solution of acid to obtain a collagen solution. Tanned wastes of leather with moisture 25 to 70% are treated with the solution containing 0.3 to g/l sodium hydrate and 0.1 to 0.5 g/l surfactant with liquid-solid ratio of 5 to 12 during 3 to 6 hours with subsequent communication to the particle size less than 0.02 mm at temperature less than 25° C. The thusly obtained leather paste has the content of dry matter 0.5 to 12%. The collagen solution, the leather paste and the cross-linking agent are mixed and homogenized at the pressure p=0.3 to 8.0 atm in inert gas or air at the temperature 5° to 80° C. and a rotary speed of the mixer 60 to 1200 rev/min during 30 to 60 min. The cross-linking agent can be formed as a mixture of aldehyde and dialdehyde, or only dialdehyde. The prepared mixture is placed on a support surface with a thickness of 5 to 300 mm and freeze it at the temperature −14° to −196° C. during 0.1 to 2 hours. The frozen material is maintained in the frozen state during 4 to 16 hours at the temperature=15° to −20° C. After unfreezing, the material is washed successively with water at the liquid-solid ratio 10 to 12 and temperature 15° to 25° C. during 1 to 1.5 hour and with water at liquid-solid ratio of 5 to 7 and temperature 85° to 95° C. during 0.5 to 1.0 hour. Then the material is squeezed to residual moisture 30 to 40% and maintained without load in air at room temperature for 10 to 12 hours.

When it is necessary to obtain a material which is to be used as an insulating components for panels and the like, the thusly obtained material after its stay in the air is treated with a solution containing alumo-potassium alum or alumo-ammonium alum 3 to 8% of mass of the material at the temperature 35° to 40° C. during 20 to 30 min. This treatment enhances fire resistance of the material. Also, in order to obtain heat insulation, sound insulation, fire insulation, 3 to 20 mass percent of tanned wastes per one ton of collagen is utilized in the solution.

When it is necessary to obtain a material with decorative properties, then after painting, additional tanning is performed with the solution of dicyanamide with the tanned agent 3 to 5% from the mass of the material at the temperature 40° to 45° C. during 10 to 15 minutes. When it is necessary to produce materials for filtration, then after maintaining the material in the air, it is treated with 2 to 5% of sodium chloride.

The surfactants in the method of the invention can be sodium alkyl sulphate or sodium dodecyl sulphate.

The method in accordance with the present invention is illustrated by the following examples:

EXAMPLE 1

Cattle leather or cattle leather cuts obtained during a contour cut of the cattle leather are washed with water and comminuted for example to pieces 3×3 cm to 5×5 cm. The comminuted material is treated with the solution containing 5 to 7 g/l sodium hydrate, 0 to 15 gl sodium carbonate and 2 to 5 g/l surfactant with the liquid-solid ratio 2. The treatment is performed at room temperature with mixing during 2.5 to 3 hours. Then the material is washed with water to pH=5.6 is subjected to the action of 5 to 5.5 hydrochloric acid solution at pH=4.5 to 5 during 2 to 2.5 hours, the treated solution is poured into the cattle leather placed on a supporting surface, the material is frozen at temperature=6° to −10° C. during 2 hours, unfrozen, and the cycle is repeated 2 to 5 times. After unfreezing, the material is washed with water to pH=5.6 to 5.9 and treated with the solution of 2.5 to 4.0 g/l sodium hydrate and 8 to 10 g/l sodium sulphate at the liquid-solid ratio=2 to 2.5 during 6 to 8 hours at room temperature and with mixing, the material is washed with water at the liquid-solid ratio 8 to 10 an subjected to the action of the solution containing 0.1 to 0.3 weight percent of sodium phosphate with pH=8 to 8.3 finalized by sodium hydrate during 2 to 2.5 hours with mixing. Then the material is washed with water with liquid-solid ratio 10 and introduced in an acetic acid solution 0.5 to 1M with liquid-solid ratio 5 to 12 for 10 to 12 hours in order to obtain a collagen solution. The prepared solution is homogenous, the particle size is no more than 0.02 mm, pH is 3 to 4.2, and solid matter content is 0.5 to 10%. After maintaining during 12 hours at temperature 8° to 10° C. and moisture not less than 90%, the material is used for preparation of a mixture for cryostructuring.

Tanned leather wastes with moisture 25 to 70% are treated with the solution of 0.3 to 1 g/l sodium hydrate and 0.1 to 0.5 g/l surfactant with liquid-solid ratio 5 to 12 during 3 to 6 hours with subsequent comminution to the particle size not less than 0.002 mm at temperature not less than 25° C. and solid matter content in the produced paste 0.5 to 12%. The collagen solution and the leather paste are mixed with ratio 1:2 to 1:15, and a cross-linking agent is added which is a solution of mixture of formaldehyde and glutar dialdehyde with ratio 1:20 to 1:50. The obtained mixture is homogenized in air pressure 0.3 to 0.8 atm and temperature 5° to 8° C. and with the rotary speed of a mixer 60 to 12000 revolutions per minute during 30 to 45 minutes.

The produced mixture is placed on a supporting surface with thickness 5 to 15 mm, frozen at temperature −50° to −60° C. for 15 to 20 minutes, and maintained in the frozen state during 10 to 12 hours at temperature −15° to −20° C.

After unfreezing, the material is washed successively with water at liquid-solid ratio 10 to 12 and temperature 15° to 25° C. during 1 to 1.5 hour, squeezed and washed with water at liquid-solid ratio of 5 to 7 and temperature 85° to 95° during 0.5 to 1.0 hours. Then the material is squeezed to residual moisture 30° to 40° C. and maintained without load in air at room temperature for 10 to 12 hours. After maintaining in the air, the material is subjected to painting-fatting operatures. After painting, the material is additional tanned with a solution of dicyandiamid resin with the quantity of tanning agent 3 to 5% of mass of the material at temperature 40° to 45° C. during 10 to 15 minutes. This operation increases the strengths and elasticity of the material.

The material-fatting operations are utilized for producing the material for decorative walls panels, leather accessories, elements of clogin and shoes, products of printing industry, decorative elements for passenger compartments of automobiles, airplanes, railroad cars. The painting-fatting operations are substantially different from known operations used in the leather industry since the agents concentratioins here at 10 to 50 times greater than during processes of treatment of natural leather, since the produced material has highly porous structure.

EXAMPLE 2

Cattle leather or cattle leather cuts analogously to the Example 1 are washed with water, comminuted, treated successively with alkali solution and surfactant, washed with water, treated with hydrochloric acid, cyclically frozen, unfrozen, washed with water, subjected to alkali-salt treatment, washed with water and introduced into orthophosphoric acid with liquid-solid ratio 5 to 12 for 10 to 12 hours in order to obtain a collagen solution. The leather paste is prepared analogously to the Example 1. The collagen solution, the leather paste and the cross-linking agent (glutaric dialdehyde) are mixed and homogenized in inert gas, for example nitrogen, with pressure 2 to 8 atm and temperature 5° to 8° C. during 30 minutes with a rotary speed of a mixer 600 to 1200 revolutions per minute. The prepared mixture is placed on a supporting surface with thickness 25 to 300 mm, frozen at temperature −75° to −196° C., and maintained in frozen state at temperature −15° to −20° C. during 4 to 10 hours. After unfreezing, washing with water and maintaining in air, as well as neutralizing with an emulsion which contains sodium formlate analogously to the Example 1, the material is treated with a solution containing alumo-potassium and alumo-ammonium alum in the quantity of 3 to 8% of mass of the material at temperature 35° to 40° C. during 20 to 30 minutes. This operation contributes to fire-retardant properties of the material. The material is then dried to residual moisture 24 to 26%. The thusly obtained material has a highly porous structure, strength, fire strength and is used for the manufacture of sandwich-type panels, for insulation of spaces and automobile, airplane, and railroad car compartments, for the manufacture of furniture, etc.

EXAMPLE 3

The leather paste and the collagen solution are prepared similarly to Example 1. Then, the collagen solution, the leather paste, and the cross-linking agent are mixed and homogenized in air at pressure 2 to 5 atm and temperature 5° to 8° C. and a mixer rotary speed 200 to 500 revolutions per minute during 30 to 60 minutes. The prepared mixture is frozen with a layer thickness 30 to 50 mm at temperature −14° to −40° C. during 1 to 2 hour with a subsequent maintenance in the frozen state during 14 to 16 hours. After unfreezing, water washing, maintaining in air, the material is treated with a solution of 3 to 5% of sodium chloride with liquid solid ratio 2 to 3, at temperature 75° to 85° C. during 30 to 40 minutes. The material is squeezed to a residual moisture 26 to 38% and dried in air.

With the method in accordance wit the present invention, it is possible to use tanned and untanned collagen containing wastes and to produce a leather-like material which is inexpensive and has unique properties such as fire-resistance, heat insulation, sound insulation, decorative appearance, high moisture permeability, high gas permeability6, etc.

It will be understood that each of the elements described above, or two or more together, may also find a useful application in other types of methods differing from the types described above.

While the invention has been illustrated and described as embodied in method of producing high-molecular products from collagen-containing materials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of producing a collagen-containing material, comprising the steps of preliminarily treating an untanned collagen-containing raw material with a solution of alkali and a surfactant at pH less than 9.5; comminuting the untanned collagen-containing raw material; preparing from the collagen-containing raw material a collagen solution after the preliminary treating and comminuting; preparing a leather paste from tanned collagen-containing waste; mixing the collagen solution and the leather paste to produce a mixture; adding a cross-linking agent to the mixture; and freezing and unfreezing the mixture having a cross-linking agent.

2. A method as defined in claim 1, wherein said preliminary treatment comprises a treatment in a solution containing 5 to 7 g/l sodium hydrate, 10 to 15 g/l sodium carbonate, 2 to 5 g/l surfactant with liquid-solid weight ratio of 1.82 for 2.5 to 3 hours with subsequent water washing to pH=5.6 to 5.9, treatment with 5.5% hydrochloric acid solution with pH=4.5 to 5 for 2 to 2.5 hours and wherein said freezing is performed cyclically at −6° to −10° C. for two hours repeatedly 2 to 5 times.

3. A method as defined in claim 1, wherein said preliminary treatment comprises a treatment in two stages including a first stage with a solution of 2.5 to 4.0 g/l sodium hydrate, and 8 to 10 g/l sodium sulfate with liquid-solid weight ratio of 2 to 2.5 for 6 to 8 hours, and a second stage with a solution of a substance selected from the group consisting of sodium phosphate and ammonium phosphate with concentration 0.1 to 0.3% by weight of the untanned collagen-containing raw material.

4. A method as defined in claim 1; and comprising dissolving the comminuted preliminarily treated untanned collagen-containing raw material in a solution of 0.2 to 1.0M of phosphoric acid with liquid-solid weight ratio of 5 to 10 for 10 to 12 hours.

5. A method as defined in claim 1; and further comprising the steps of maintaining the collagen solution for 12 hours at a temperature of 8° to 10° C. and moisture not more than 90%.

6. A method as defined in claim 1; and further comprising the step of treating the tanned collagen-containing waste with a solution containing 0.3 to 1 g/l sodium hydrate and 0.1 to 0.5 g/l surfactant with liquid-solid weight ratio of 5 to 12 for 3 to 6 hours at a temperature not higher than 25° C. with subsequent comminution to a particle size less than 0.02 mm.

7. A method as defined in claim 1; and further comprising mixing and homogenizing the cross-linking agent and said mixture, said mixing homogenizing being formed at a pressure of 0.3 to 8 atm in a medium selected from the group consisting of inert gas and air at a temperature of 5° to 8° C. for 30 to 60 minutes with a mixer having a rotary speed of 60 to 1200 revolutions per minute.

8. A method as defined in claim 1; and further comprising the step of placing the mixture having the cross-linking agent on a supporting surface with thickness of at least 5 to 75 mm and freezing at a temperature of −14° to −196° C. for 0.1 to 2 hours to form a frozen mass with subsequent maintaining of the frozen mass for 4 to 16 hours at a temperature of −15° to −20° C.

9. A method as defined in claim 8; and further comprising the steps of unfreezing, water washing and maintaining in air the mixture having the cross-linking agent, neutralizing the mixture having the cross-linking agent with an emulsion containing sodium formiate, and treating the mixture having the cross-linking agent with a water solution containing alumo-potassium and alumo-ammonium alum at a quantity of 3 to 8% based on the mass of the mixture having the cross-linking agent at a temperature of 35° to 40° C. for 20 to 30 minutes.

10. The method as defined in claim 1; and further comprising the steps of painting the material from the freezing and unfreezing step; and subsequently tanning the painted material at a temperature of 40° to 45° C. for 10 to 15 minutes with a solution of a dicyandiamide resin tanning agent wherein the quantity of the tanning agent is from 3 to 5% by mass of the mass of the material from the freezing and unfreezing step.

11. The method as defined in claim 1; wherein the mass of the tanned collagen-containing waste is 3 to 20 mass percent of the collagen solution.

\* \* \* \* \*